United States Patent Office 3,451,820
Patented June 24, 1969

3,451,820
DISPERSIONS OF LIPOPHILIC COLOR-COUPLING COPOLYMERS
Jacob Quentin Umberger, Holmdel, N.J., assignor to E. I. du Pont de Nemours and Company, Wilmington, Del., a corporation of Delaware
No Drawing. Filed Dec. 1, 1965, Ser. No. 510,965
Int. Cl. G03c 1/10
U.S. Cl. 96—100                  10 Claims

ABSTRACT OF THE DISCLOSURE

A color-forming dispersion comprising an aqueous gelatin solution having dispersed therein
(1) A color-coupling lipophilic copolymer prepared by free-radical initiated addition polymerization of an ester of acrylic acid, methacrylic acid or maleic acid and an ethylenically unsaturated monomer of the formula

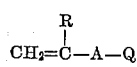

where R is hydrogen or lower alkyl, A is a bivalent radical of

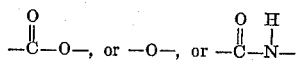

and Q is an organic color-forming radical containing the group

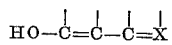

where

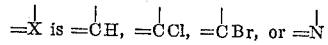

said ethylenically unsaturated monomer being further characterized by containing at least one amidehydrogen group, and said copolymer being dissolved at a concentration of 10%–50% by weight in
(2) an organic solvent for said copolymer having a boiling point below 200° C. and having a water-solubility no greater than that of methyl acetate.

---

This invention relates to color photography. More particularly it relates to multicolor elements for chromogenic development and to novel methods of preparing the color coupling dispersions which are incorporated in photographic silver halide emulsions and coated to form said elements.

It is known to prepare multicolor elements wherein migration of integral hydrophilic color couplers from one layer to another is minimized by employing solutions of polymeric color couplers. Such elements, as disclosed in assignee's U.S. Patent 3,211,552, have been found to provide extremely thin emulsion layers with resultant sharp images for an integral coupler system. The layer thinness is possible because the polymeric color coupler functions as a co-binder with gelatin, thus permitting the use of reduced quantities of gelatin in the emulsion. Such elements, however, have suffered from brittleness in dry atmospheres or climates, while the emulsions from which they are coated are unstable in viscosity and the couplers have a tendency to migrate because of their water solubility. Earlier hydrophilic color coupling materials subject to these same limitations are the soap type, i.e., nonpolymeric couplers made resistant to migration by the attachment of long chain alkyl groups and made hydrophilic by the inclusion within the molecule of sulfonate or carboxylate groups.

As another approach, lipophilic color couplers, especially those with attached long chain alkyl groups, have been dissolved in high-boiling oils and dispersed in aqueous gelatin-silver halide photographic emulsions. The above problems of brittleness and viscosity instability of the emulsions may have been overcome in this manner but since such nonpolymeric color couplers have relatively little function as co-binders with gelatin, essentially full quantities of gelatin are required. This along with the relatively high equivalent weight of the nonpolymeric coupler is an opposing factor to obtaining the extreme emulsion layer thinness which is desired. Also the oil softens the emulsion layer.

Still another type of element is disclosed in U.S. Patent 2,852,381, wherein a homopolymeric color coupler, prepared by grafting color coupling groups onto a non-color coupling, preformed polymer, is dissolved in a high boiling crystalloidal material and the resulting solution is dispersed in the form of liquid droplets in a gelatino-silver halide emulsion. The crystalloidal material is present in large quantities relative to the polymeric color coupler, e.g., 12 parts to 1, which makes it difficult to achieve thinness in the emulsion layers. The apparent low oil solubility of these polymers appears due to approximately 100% coupler grafting and to the bulky aromatic ring directly attached to the polymer backbone.

It is an object of the present invention to provide improved emulsions for chromogenic photographic elements. Another object is to provide emulsions which will give photographic elements having a combination of the thin layers required for high definition, the processing simplicity of integral coupler emulsions, improved dimensional stability and improved toughness and flexibility, especially at low relative humidities. Yet another object is to provide novel dispersions of polymeric color couplers, selected for unusually high solubility in lower aliphatic esters and methods of preparing such dispersions. Still further objects will be apparent from the following description of the invention.

These and other objects of this invention are accomplished by forming a dispersion comprising a gelatin solution having dispersed therein (1) a color-coupling lipophilic copolymer prepared by free radical initiated addition polymerization of an ester of acrylic, methacrylic or maleic acids and a color coupling ethylenically unsaturated monomer of the formula

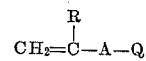

where R is hydrogen or lower alkyl, A is a bivalent radical of

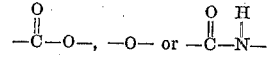

and Q is an organic color-coupling radical containing (in an enol form) the group

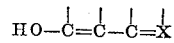

where

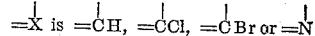

dissolved in (2) an organic solvent for said copolymer having a boiling point below 200° C., said color coupling monomer containing at least one amide-hydrogen group. It is preferred that the lipophilic copolymeric coupler have a solubility of at least 10% by weight in ethyl acetate at 100° F. This dispersion is further mixed with a photographic emulsion containing light-sensitive silver halide in a gelatin solution to form a color-forming light-sensitive emulsion which can be coated on a support.

It has been found that the coupling copolymers of this invention are particularly suited to a temporary oil dispersion method due to their outstanding solubility in lower esters, e.g., lower alkyl esters of acetic acid such as ethyl acetate, at moderate temperature. Also, the temporary oil dispersion method avoids the use of alkali and thereby prevents hydrolysis of the ester couplers of the invention, and conveniently permits incorporation of a small, plasticizing amount of permanent oil in the solid coupling latex particles.

The removable organic solvent, sometimes referred to as a "volatile oil" due to its immiscibility with water, is removed either before the dispersion is coated or (less preferably) by volatilization during the drying of the coated dispersion. The removable solvents include those with some limited water solubility to permit removal by water washing, e.g., in gelatin noodle form, and those removable by the spray drying, vacuum or steam purging methods.

In carrying out the invention, a copolymer of a color coupling vinyl monomer, e.g., 1-phenyl-3-methacrylamido-5-pyrazolone, with at least one predominantly nonionizable comonomer, e.g., ethyl acrylate, butyl acrylate, diethyl maleate, etc., is dissolved, in a concentration of about 10 to 50% by weight, in a removable organic solvent such as an ester, e.g., a lower alkyl ester, a lower alkyl ether, a ketone, a halogenated hydrocarbon, e.g., methylene chloride or trichloroethylene, a fluorinated hydrocarbon, certain alcohols, e.g., n-butyl through octyl or in general any organic solvent with a boiling point below 200° C. and with water solubility no greater than methyl acetate. The preferred solvents normally contain one or more doubly bonded oxygen atoms and have a specific gravity close to that of water (e.g., .8 to 1.2). Mixtures of miscible low-boiling point solvents have been found to be extremely useful. In using solvent mixtures, it is desirable to select the separate solvents in such a manner as to give a solvent mixture which has a specific gravity about equal to that of water (e.g., 8 to 1.2).

A permanent solvent, i.e., a high boiling (above 200° C.), water immiscible organic solvent, may be added in a small amount (less than 50% of the weight of the color-coupling copolymer) to the above mixture to increase dispersion stability, to control the dye hue resulting from the reaction of the dispersed coupler with an oxidized color developer, and to improve the flexibility of the coated emulsion. The concentration of permanent solvent should be sufficiently low that it will plasticize the copolymer while allowing it to remain in relatively solid particuate form. The utilization of a relatively low concentration of permanent solvent is also desirable so that the final coating thickness of the emulsion may be minimized in order to maintain high definition.

A dilute aqueous solution of gelatin (at a pH above its isoelectric point) and an anionic emulsifier such as sodium lauryl sulfate is prepared in a separate vessel. Preferably the coplymer solution is then added rapidly to the gelatin solution in a high shear-rate mixing device, the volumes of the two solutions being chosen so that there is sufficient water for the formation of an "oil in water" dispersion but not so much that excessive temporary solvent is extracted from the oil phase (with resultant precipitation of polymer). Finally, the removable organic solvent is volatilized by steam or vacuum distillation or removed by noodle washing, to yield a very fine dispersion (i.e., one which appears bluish by reflection because of light scattering effects) which is added to a photographic emulsion. Usually three such emulsions, each containing a dispersion of lipophilic copolymer capable of color coupling to form a dye absorbing in a different region of the visible spectrum, are coated on a suitable support, along with various auxiliary layers such as filter, antiabrasion, separator and nonhalation layers. Such a resultant, multilayer element is particularly useful as a color, camera speed, reversal film for making cine or still pictures. The so-called "conventional" structure is preferred which comprises a film support bearing, in order, a red-sensitive silver halide emulsion layer containing a cyan color coupler, a green-sensitive silver halide emulsion layer containing a magenta color coupler, a yellow filter layer, and a blue-sensitive silver halide emulsion layer containing a yellow color coupler.

Suitable color-coupling monomers include acrylamidobenzoylacetanilide yellow couplers, 1-phenyl-3-acrylamido-5-pyrazolone magenta couplers, and vinyl-1-hydroxy-2-naphthamide cyan couplers as described, for example, in U.S. Patent 2,976,294 and in assignee's copending applications of Firestine and Umberger, Ser. No. 358,920, filed Apr. 10, 1964, (U.S. P. 3,356,686, Dec. 5, 1967) and of Umberger, Ser. No. 419,227, filed Dec. 17, 1964 (U.S.P. 3,298,013, Jan. 17, 1967). Of these it has been found that the methacrylylamides and vinyl ethers are particularly useful.

These color-coupling monomers contain color-coupling nuclei, i.e., nuclei containing groups which are capable of coupling with oxidation products of aromatic primary amine developing agents, e.g., p-phenylenediamine, formed during the development of silver salt images, to form a quinoneimine, azomethine, or in some instances an azo dye image. In preferred color couplers, the nuclei have a structure which may be represented by the formula

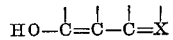

where

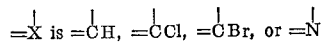

which is a general structure of the color-coupling nucleus in an enol form.

The foregoing nuclei are found in the reactive methylene dye intermediates and in aromatic hydroxyl compounds. These groups occur in phenols, naphthols, acylacetamides, cyanoacetyls, β-ketoesters, pyrazolones, homophthalimides, coumaranones, indoxyls, thioindoxyls, and indazolones. Preferably the nuclei are a 1-phenyl-3-amido-5-pyrazolone, an acylacetanilide or a 1-hydroxy-2-naphthamide.

Color coupling monomers such as those above are copolymerized with at least one predominately nonionizable comonomer in the presence of an addition polymerization initiator, preferably one which is active thermally below 100° C. However, initiators activatable by actinic radiation can be used. Suitable initiators are disclosed in U.S. Patent 2,830,972. Magenta color coupling copolymers are the subject of Firestine & Umberger, U.S. 3,163,625, but the disclosed color couplers are generally hydrophilic, as opposed to our lipophilic dispersions, due to comonomer composition and are always employed in an alkaline solution process.

The color forming copolymers should have an equivalent weight of no more than 600 in order to yield the derised thin, high-definition emulsion layers. The equivalent weight can be determined from ultraviolet absorption spectra of known concentrations in organic solvents such as ethyl Cellosolve. The equivalent weight is calculated by assuming that the extinction coefficient of the coupling monomer is unchanged by copolymerization. The present copolymeric lipophilic color couplers usually have lower equivalent weights than related color couplers which have been made relatively non-migratory by inclusion of weighting groups, e.g., long chain alkyl groups, in the molecule.

Furthermore, it has been found that the dispersed, copolymeric, lipophilic color couplers of this invention can act as co-binders with gelatin and thus replace a part of the latter as the carrier for light-sensitive silver halide crystals. This co-binder function of the color coupler is an important factor in achieving the very thin emulsion layers, e.g., about .0004 inch total, required to obtain high definition in an integral coupling element (i.e., an element in which the color former or color coupler is present at times of exposure as opposed to elements which require the addition of color couplers during photographic processing). The co-binder function of the present color couplers gives them a property which has been designated as low "effective equivalent weight," which term takes into account the gelatin which they replace. The term "effective equivalent weight" is discussed in more detail in assignee's patent application of Chu et al., Ser. No. 113,100, filed May 29, 1961 (U.S.P. 3,211,552, Oct. 12, 1965), in which a limit of 1750 is suggested as the maximum allowable for a satisfactory color coupler in an element such as that of the present invention, especially in a modern element of the high definition required for 8 mm. cine use.

According to a further aspect of the invention, after the first non-color-forming development, the film element is reexposed to light and then developed in an aqueous alkaline developer solution of the type disclosed in Example I of Jennings U.S. Patent 2,397,865. However, any of the other color-developing agents described in said Jennings Patent can be used.

Elements made up of integral coupler emulsions obviously become more susceptible to interlayer color contamination (particularly the contamination due to migration of oxidized developer during the color development step) as the emulsion layers become thinner. It is known that this color contamination can be effectively reduced by the addition of competing couplers, e.g., phenols that form a soluble removable dye on coupling (such as citrazinic acid). Also, it is known that large concentrations of sodium sulfite in the color developer solutions are effective in reducing interlayer color contamination caused by migration of oxidized developer. The color developer solutions may also contain a small proportion of an organic solvent e.g., benzyl alcohol, benzyl amine, or dimethyl formamide to insure full development of maximum dye density, particularly in emulsions relatively high in their ration of synthetic lipophilic polymer to gelatin.

The invention will be further illustrated by but is not intended to be limited to the following procedures and examples. As can be seen from these examples, the ratio of gelatin to lipophilic copolymeric color coupler in the binder (including gelatin added by mixing the color coupler dispersions with the gelatino-silver halide) ranges from about 1/2 to 2/1 by weight, though a range of 1/3 to 3/1 is also satisfactory.

The color-forming copolymer having at least one recurring amide-hydrogen-containing group provides a low cost route to lipophilic polymers of unique solubility in the volatile ester solvents employed to make the coupling latices of this invention. This is in contrast to the amide-hydrogen-containing color couplers of the prior art which utilized long-chain alkyl groups to provide the lipophilic qualities of the color former since such compounds were found to have inadequate solubility in the low boiling point esters to be of any value in the present dispersion process.

The volatile oil approach minimizes any hydrolysis of the ester groups which can occur in alkaline dispersion methods. Usually one mole or more of the non-coupling ester comonomer is employed per mole of coupling monomer. Also, the moderate degree of polymerization achieved in these polymers allows ester solubility with moderate viscosity and good dispersibility. It has been discovered that the polymerization inhibiting properties of the color-coupling monomer component actually can be advantageous in controlling the degree of polymerization in the mixture with the non-coupling, active monomer. Additionally, the amide-hydrogen-containing color-former polymers give better color definition than their related non-copolymeric color formers. This is particularly true for the magenta color formers.

PROCEDURE A (Dispersion in absence of permanent solvent)

(1) Two solutions, (a) and (b), were prepared:
   (a) Two hundred grams of a 1.5% by weight aqueous solution of bone gelatin (pH 5.6 at 35° C.) is heated to 100° F. and 8 ml. of a 10% by weight aqueous solution of sodium lauryl sulfate is added.
   (b) Ten grams of a lipophilic copolymeric color coupler is dissolved in 100 ml. of ethyl acetate at 100° F.
(2) Solution (b) is added to an explosion proof blender (Waring Products Corp., Winsted, Conn.) stirring at maximum speed and solution (a) is added rapidly.
(3) After 1 minute blending time, the blender is turned off and the ethyl acetate removed by distillation at reduced pressure.

A sample of the resulting blue-white opaque emulsion dries on a microscope slide to produce a colorless transparent film.

PROCEDURE B (1) Two solutions, (a) and (b), were prepared:
   (a) Twenty grams of a lipophilic copolymeric color coupler is dissolved in 100 ml. of ethyl acetate at 100° F. and 6 ml. of diisobutylphthalate is added.
   (b) One hundred and twenty-five grams of a 3% by weight aqueous solution of bone gelatin (pH 5.6 at 35° C.) is heated to 100° F. and 16 ml. of a 10% by weight aqueous solution of sodium lauryl sulfate is added.
(2) Same as step (2) of Procedure A.
(3) Same as step (3) of Procedure A except that the blending time is increased to 2 minutes.

PROCEDURE C (1) Two solutions, (a) and (b), were prepared:
   (a) Ten grams of a lipophilic copolymeric color coupler is dissolved in 100 ml. of ethyl acetate at 100° F. and 3 ml. of diisobutylphthalate is added.
   (b) Two hundred grams of a 1.5% by weight aqueous solution of bone gelatin (pH 5.6 at 35° C.) is heated to 90° F. and 10 ml. of a 10% by weight aqueous solution of sodium lauryl sulfate is added.
(2) Same as step (2) of Procedure A.
(3) Same as step (3) of Procedure A.

PROCEDURE D (1) Two solutions, (a) and (b), were prepared:
   (a) Thirty grams of a 10% by weight aqueous solution of bone gelatin (pH 5.6 at 35° C.) 98 grams of distilled water, and 80 ml. of a 1% by weight aqueous solution of the dioctyl ester of sodium sulfosuccinic acid is mixed at 90° F.
   (b) Ten grams of a lipophilic copolymeric color coupler are dissolved in 100 ml. ethyl ectate at 100° F., and 3 ml. of phenyl Cellosolve is added.
(2) Same as step (2) of Procedure A.
(3) Same as step (3) of Procedure B.

Example I

A color reversal film was made by coating on a film support, in order, a red-sensitive gelatino-silver iodobromide emulsion layer containing a cyan color coupler; a gelatin separator layer; a green-sensitive, gelatino-silver iodobromide emulsion layer containing a magenta color coupler; a yellow filter layer containing a dye made as described in Example I of Chu and Umberger U.S. Ser. No. 823,310 filed June 29, 1965, now Patent 3,182,029; a blue-sentitive, gelatino-silver iodobromide emulsion layer containing a yellow color coupler; and, finally, a gelatin antiabrasion layer. On the opposite side of the film support there was coated a non-halation layer. The red-sensitized gelatino-silver iodobromide emulsion for the cyan layer containing approximately 7 mole percent iodide, the remainder being silver bromide. The cyan color coupling copolymer was made by free radical addition polymerization of 1.5 moles of ethyl acrylate with 1 mole of a naphthol cyan color coupling monomer having the formula

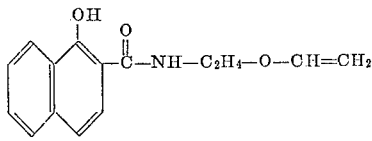

disclosed in assignee's copending application of Umberger, Ser. No. 419,227, filed Dec. 17, 1964.

The copolymerization was carried out in a 12-liter, round bottom, 3-necked flask fitted with a stirrer, heating mantle and reflux condenser. To the flask there were charged 257 g. of the above color coupling monomer, 1-hydroxy-N-(β-vinyloxyethyl)-2-naphthamide, and 1800 ml. of 95% ethanol. At reflux, a solution of 4 g. of azo-bis-isobutyronitrile dissolved in 150 g. of ethyl acrylate was added in 3 equal portions at ½-hour intervals. Following the last addition, the system was refluxed for 2 hours (total 3 hours). The product was then poured into 2.5 liters of ice water, filtered and washed with 5 liters of water. After washing with 10% sodium carbonate, the product was filtered and washed with 6 liters of water and filtered again. Yield of the air dried product was 361 g. of a lipophilic copolymer having an equivalent weight of 433 and an intrinsic viscosity, in dimethyl formamide at 30° C., of 0.112 deciliter/gram. The copolymer was dispersed in dilute gelatin with an anionic dispersing agent according to Procedure C and added to the silver halide emulsion, the copolymer being present in an amount (by weight) of 1.0 part per 2.1 parts silver halide and 1.5 parts of gelatin. This cyan emulsion was coated to give a coating weight of 21 mg. of silver halide per dm.$^2$.

The green-sensitized gelatino-silver iodobromide emulsion for the magenta layer contained approximately 7 mole percent silver iodide, the remainder being silver bromide. The magenta color coupler was a lipophilic copolymer made by free radical addition polymerization of 3.24 moles of methyl methacrylate with 1 mole of a pyrazolone monomer having the formula:

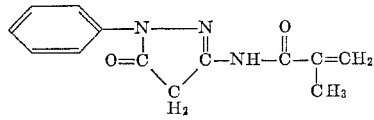

and disclosed in Firestine and Umberger, U.S. Patent 3,163,625.

This copolymerization was carried out in the 12-liter flask described above to which there were charged:

| | |
|---|---|
| 1-phenyl-3-methacrylamido pyrazolone | g-- 486 |
| Tertiary butanol | liters-- 4 |
| Methylmethacrylate | g-- 648 |

After heating to reflux, with stirring, a solution of 10 g. of azo-bis-isobutyronitrile dissolved in 200 ml. tertiary butanol was added. After 1 hour reflux, 2.5 liters of n-butyl ether was added while stirring continued. The product was filtered, washed with 1 liter n-butyl ether and then 1 liter of ethyl ether. After air drying, the yield was 997 g. of a lipophilic copolymer having an equivalent weight of 525. This copolymer was dispersed in dilute gelatin with an anionic dispersing agent according to Procedure D. This copolymer was present in an amount (by weight) of 1 part per 1.7 parts of silver halide and 1 part of gelatin. The magenta layer was coated to give a coating weight of 15 milligrams of silver halide per square decimeter.

The blue-sensitive gelatino-silver iodobromide emulsion for the yellow layer contained equal parts by weight of a gelatino-silver iodobromide emulsion containing 7 mole percent silver iodide and a gelatino-silver bromide emulsion containing no other silver halide. The yellow color coupler was a lipophilic copolymer made by free radical addition polymerization of 1.5 moles of 2-ethyl-hexyl acrylate with 1 mole of α-benzoyl-2-methoxy-5-methacrylamidoacetanilide.

The copolymerization was carried out in the 12-liter flask described above to which there were charged:

| | |
|---|---|
| α-Benzoyl - 2 - methoxy - 5 - methacrylamidoacetanilide | g-- 525 |
| Tertiary butanol | ml-- 2630 |
| Dimethyl formamide | ml-- 1050 |

After heating to reflux 410 g. of a 2-ethylhexylacrylate were added along with a 30 ml. tertiary butanol rinse. At reflux, 7.35 g. of azo-bis-isobutyronitrile were added and the system was refluxed for 1 hour. With good agitation, the reaction mixture was poured slowly into 12 liters of ice water. After washing successively, with 2 and 5 liters of water, the polymer was stirred with 4150 ml. of hexane, three times. After air drying at room temperature, the yield was 800 g. of a lipophilic copolymer having an equivalent weight of 556. This copolymer was dispersed in dilute gelatin with an anionic dispersing agent and ethyl acetate according to the method described in Procedure C, the copolymer being present in an amount (by weight) of 1.2 parts per 1.0 part of AgX and 0.74 part of gelatin. The yellow emulsion was coated to give a coating weight of 16 milligrams of silver halide per square decimeter.

The above film was slit to 16 mm. width double—8 mm., perforated in darkness, and exposed in an 8 mm. camera to an outdoor scene at exposure index 25. The film was then processed according to the procedure described in Example I of assignee's copending application of Seiter and Umberger, U.S. Ser. No. 388,282, filed Aug. 7, 1964.

The resulting 8 mm. film yielded projected images of good over-all quality with resolution at least equal to that of the highest quality commercial films (including those which use nonintegral color couplers).

In similar experiments, the vinyl ether cyan monomer of Example I was copolymerized, in one instance, with ethyl acrylate and, in another instance, with dimethyl maleate. In both cases the copolymerization reaction was carried out in ethyl acetate solvent, using azo-bis-isobutyronitrile as the polymerization initiator. Without isolating the copolymers, their solutions were dispersed in aqueous gelatin solutions and added to gelatino-silver chlorobromide photographic emulsions which gave a combined emulsion containing about 3.8% by weight silver halide (calculated as silver bromide). This is a preferred method of handling the copolymeric color couplers to form the dispersions of this invention. Fewer steps are required when copolymer does not have to be isolated and the process is more economical since the low boiling solvent (e.g., ethyl acetate) can be used both in the copolymerization reaction and in the formation of the dispersion. Many impurities and unreacted monomer are conveniently removed by vacuum or steam purging after completion of dispersion alone, or by additional treatment of passing through a purification column, e.g., an ion or molecule exchange column or an adsorption column.

Example II

A color reversal film similar to that of Example I was prepared but with the iodide content of the emulsions reduced from 7.0 moles percent to 3.5 percent. The other details of the coatings include:

| Layer | AgX | Coupler | Gelatin |
|---|---|---|---|
| Abrasion | | | 10 mg./dm.$^2$ |
| Yellow emuls | 15 mg./dm.$^2$ | 17 mg./dm.$^2$ | 11 mg./dm.$^2$ |
| Yellow filter | | Optical density of 1.8 at 440 m$\mu$ | 10 mg./dm.$^2$ |
| Magenta emuls | 13 mg./dm.$^2$ | 7 mg./dm.$^2$ | 9 mg./dm.$^2$ |
| Separator | | Optical density of 0.8 at 540 m$\mu$ | 10 mg./dm.$^2$ |
| Cyan | 21 mg./dm.$^2$ | 11 mg./dm.$^2$ | 15 mg. gel. |
| Support | | | |

The support is a 0.004 inch thick dimensionally stable vinylidene chloride/methyl acrylate/itaconic acid copolymer coated polyethylene terephthalate film base like that disclosed in Example IV of Alles, U.S. Patent No. 2,779,689 with a thin blue colloidal antihalation undercoat as disclosed in Belgian Patent No. 630,385, issued Sept. 3, 1963. Total emulsion thickness was about 0.0004 inch which is desirable for images of high resolution.

The above film was given a white light exposure on an Eggert "resolvometer," described in Proceedings of the Royal Photographic Society Centenary Conference, London (1953), page 292. The resolution of this film was compared with that of two commercially available films, exposed in a similar manner and processed commercially according to manufacturer's recommendations.

Film: Resolution
- High definition commercially available nonintegral coupler film (0.0004 inch total emulsion thickness), lines/mm. _____ 105
- High definition commercially available integral soap-type couplers (0.0005 inch total emulsion thickness _____ 85
- Example II film—integral lipophilic copolymer dispersions (0.0004 inch total emulsion thickness) _____ 115

The film prepared for this example was processed in a manner similar to that described in Example I but with changes in the first, or black and white, development to increase development adjacency for greater sharpness and brilliance of color.

Example III

The multilayer film of Example II was compared for flexibility with various other films including films A and B, below, which were essentially identical except for the support.

In film A the support was the same polyethylene terephthalate film but the blue colloidal silver antihalation undercoat was replaced with an antihalation backing layer of gelation and a mixture of three organic dyes (a yellow, a magenta, and a green dye) which gave an essentially neutral color. The dyes were used in a sufficient concentration to have a transmission optical density of greater than 1.0 throughout the entire visible spectrum. The dyes are temporary in that they are either washed out or chemically discharged during processing.

In film B the support was a cellulose triacetate film, 0.005 inch in thickness, with the blue colloidal silver antihalation undercoating of Example II.

Film C comprises hydrophilic copolymeric color couplers which were incorporated into the photographic emulsions as solutions rather than as dispersions. This film is described in Chu et al., U.S. Ser. No. 113,100, filed May 29, 1961, Example II; "Film I."

Film D is a commercially available, nonintegral coupler, color film.

The flexibilities (or wedge brittleness) of the various films were compared, as recorded below, in terms of their break points and crack diameters following the testing procedure described by P. L. Adelstein, Photographic Science and Engineering, vol. 1, No. 2, October 1957, pp. 63–68.

| Film | Break point (inch) | Crack point (inch) |
|---|---|---|
| Film of Example II | <.06 | 0.22 |
| Film A | <.06 | 0.22 |
| Film B | 0.10 | 0.27 |
| Film C | | 0.70 |
| Film D | 0.21 | 0.21 |

The flexibility advantages of the lipophilic polymer couplers over the hydrophilic polymer couplers are apparent.

Example IV

A cyan coupling copolymer was prepared in a manner similar to that described for the preparation of the cyan copolymer of Example I. One mole of the cyan monomer of Example I, 1 - hydroxy - N - (β - vinyloxyethyl)- 2 - naphthamide, was reacted with 1.2 moles of diethyl maleate to form a 1:1 copolymer of equivalent weight 433. Sixteen grams of this copolymer were dissolved in 100 ml. of ethyl acetate at 100° F. and 7.5 ml. of diisobutyl phthalate were added. The solution was added to the explosion proof blender of Procedure A with stirring speed controlled by means of a rheostat which reduced operating voltage to 80 volts. Four hundred and sixteen grams of the gelatin solution of Procedure A, at a temperature of 90° C., was added rapidly and blended for 1 minute giving a good dispersion of the materials. After removing the ethyl acetate by reduced pressure distillation, the dispersion was added to a gelation-silver halide photographic emulsion like that described in Example I and coated on the film base of Example I at a coating weight of 20 mg./dm.$^2$ (calculated as silver bromide). The ratio, by weight, of silver halide/gelatin/coupling copolymer was 2/1.5/1.0. A sample of the dried film was exposed, processed and sensitometrically examined according to a procedue similar to that described in Example I with a good image being obtained.

Example V

A magenta color coupling copolymer was prepared in a manner similar to that described for the preparation of the magenta copolymer of Example I. One mole of the magenta monomer of Example I, 1 - phenyl - 3- methacrylamido - 5 - pyrazolone, was reacted with 3 moles of ethyl acrylate to form a copolymer of equivalent weight 540. Ten grams of this copolymeric color coupler was dispersed, in the absence of permanent solvent, according to Procedure A which uses ethyl acetate as the low-boiling point solvent. A magenta monolayer coating of good quality was obtained from this dispersion.

Excellent results were also obtained when n-propyl acetate, and n-butyl acetate were used as the low-boiling point solvent.

Example VI

A cyan color coupling copolymer was prepared in a manner similar to that described for the preparation of the cyan copolymer of Example I whereby one mole of the monomer of that example, 1 - hydroxy - (β - vinyloxyethyl) - 2 - naphthamide, was reacted with 1.5 moles of ethyl acrylate. The resulting copolymer with an equivalent weight of 494, was dispersed according to Procedure B to form a particularly useful dispersion because of its high concentration. The blue white dispersion dried to a clear film.

Example VII

A magenta color coupling copolymer is prepared by free radical addition polymerization of 3 moles of ethyl acrylate with 1 mole of the pyrazolone monomer disclosed in Example I. Forty grams of this copolymer is dissolved at 35–40° C. in 19 ml. of ethyl phthalate and 100 ml. of methylene chloride plus 225 ml. of ethyl acetate.

In another vessel, 20 g. of photographic gelatin is dissolved at 36–40° C. in 1000 ml. of water containing 30 g. of an amphoteric surfactant, the disodium salt of N-dodecyl B-iminodiphopionate. The color coupled solution is added to the gelatin solution with vigorous stirring for about ten minutes. The resultant dispersion is filtered through filter paper and the temporary solvent mixture of methylene chloride and ethyl acetate is stripped off by vacuum distillation to give an excellent dispersion of the magenta color coupling copolymer in gelatin.

Exampe VIII

A yellow methacrylyl ester color coupling monomer of the formula

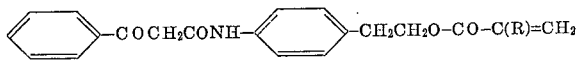

was prepared by adding the following ingredients to a 3-necked flask with stirrer column and take-off head:

| | |
|---|---|
| p-Aminophenethyl alcohol _____g__ | 100.0 |
| Xylene _____ml__ | 250.0 |
| Ethyl benzoylacetate _____g__ | 70.0 |

The mixture was distilled until 56 ml. of the distillate was condensed. Water was then added to the distillate to make a total of 100 ml. Xylene separated from the solution in the amount of 10 ml. Thus approximately 46 ml. of ethanol were removed in the reaction. The reaction mixture was concentrated by vacuum distillation and then poured over cracked ice. Twenty ml. of concentrated hydrochloric acid were added over the ice. Next day, the water was decanted off and the product was collected on a filter and washed with ether.

Yield: 30 g. of α-benzoyl-p-(β-hydroxyethyl) acetanilide, M.P. 115–116° C.

*Analysis.*—Theory: 17 C, 72.0%; 3 O, 16.9%; 1 N, 4.9%; 17 H, 6.0%. Found: 17 C, 71.8%; 3 O, 17.3%; 1 N, 4.7%; 17 H, 6.1%.

The following materials were placed in a stoppered flask and left overnight:

| | |
|---|---|
| Dioxane _____ml__ | 100.0 |
| α-Benzoyl-p-(β-hydroxyethyl)acetanilide ____g__ | 5.0 |
| Quinoline _____ml__ | 5.0 |
| Methacrylyl chloride _____ml__ | 4.0 |

Crystals of a water-soluble undesired by-product formed (see Hickmott, J. Chem. Soc., pp. 883–7, March 1964), but were removed by adding water to the reaction mixture making a total volume of 500 ml. The oily product was removed from the system by extraction with 150 ml. ethyl acetate. The ethyl acetate extract was diluted to make 200 ml. total, with additional ethyl acetate.

One hundred ml. of the above ethyl acetate solution of the ester product were refluxed with

| | |
|---|---|
| Ethyl acrylate (inhibited) _____ml__ | 7.5 |
| Azo-bis-isobutyronitrile _____g__ | 0.4 | for 2 hours. The resulting solution, when dried on a microscope slide, formed a clear, soft film. Without ever isolating the copolymeric color coupler, fifty ml. or one-half of the reaction mixture was then dispersed in 300 ml. of a 1% aqueous gelatin solution and 10 ml. of a 10% aqueous solution of sodium alkyl naphthalene sulfonate.

This gelatin dispersion of color coupling copolymer was added to 500 g. of a gelatino-silver chlorobromide cine positive emulsion. After the addition the emulsion was analyzed and found to contain 3.82% by weight silver halide (calculated as silver bromide). The emulsion was applied at a coating weight of 38 mg./dm.² (calculated as AgBr) to a cellulose triacetate film base which had been subbed with a rather thick (35 mg./dm.²) layer of chrome alum hardened gelatin. A sample of this coating was given a sensitometric exposure and then processed essentially as in Example I to yield a strong yellow image.

Example IX

A cyan color coupling intermediate of the formula

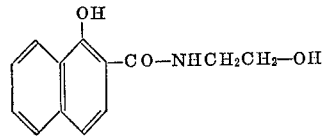

was prepared according to the following procedure:

(1) Charge 1320 g. (5.0 moles) of phenyl-1-hydroxy-2-naphthoate, 306 g. (5.0 moles) of ethanolamine, and 2640 ml. of absolute alcohol to a 12-liter flask.

(2) Bring to the boiling point and reflux the charge for four hours.

(3) Transfer the hot dark brown solution to a 5 gal. stainless steel can, add 1320 ml. of absolute alcohol, and cool to 0 to −5° C. by adding pulverized Dry Ice with good mechanical stirring.

(4) Filter the precipitate on a 12-inch or larger Buchner funnel; when the charge has sucked down to a soft cake, wash with the ice-cold absolute alcohol used to rinse out the 5-gal. can.

(5) Charge the wet filter cake to 8250 ml. of methanol in a wide mouth 12-liter flask and dissolve by heating to the boiling point. Boil off about half the methanol and cool the concentrated solution by the direct addition of Dry Ice.

The intermiate, N-(β-hydroxyethyl)-1-hydroxy-2-naphthamide, precipitated from the cold methanol solution and was dried to give a yield of 360 g. of a material having a melting point of 160–161° C. The analysis was as follows:

*Analysis.*—Theory: 13 C, 67.50%; 3 O, 20.80%; 1 N, 6.06%; 13 H, 5.64%. Found: 13 C, 67.50%; 3 O, 20.81%; 1 N, 5.93%; 13 H, 5.61%.

The following materials were refluxed until the hydroxy intermediate dissolved due to its esterification:

| | |
|---|---|
| Methylene chloride _____ml__ | 300 |
| N-(β-hydroxyethyl)-1-hydroxy-2-naphthamide _g__ | 6.0 |
| Quinoline _____g__ | 3.9 |
| Methacrylyl chloride _____g__ | 3.6 |

Thus a color coupling monomer was formed in solution. The monomer, N-(β-methacrylyloxyethyl)-1-hydroxy-2-naphthamide, had the formula

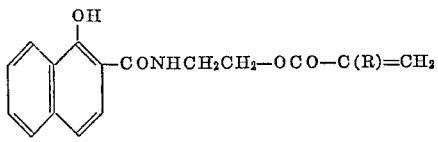

The solvent was evaporated off overnight and the resulting gum dissolved in 200 ml. of ethyl acetate. Ten ml. of a noncolor coupling comonomer, ethyl acrylate, and 0.1 g. of the initiator, azo-bis-isobutyronitrile, were added and the mixture was refluxed for 1 hour. The resulting polymerization mixture was dispersed in an aqueous gelatin solution, added to a photographic emulsion, coated, and exposed and processed essentially as in Example VIII to yield a cyan image of excellent spectral properties.

Although this invention is particularly applicable to negative and reversal color films which are designed for exposure in a camera, it is also useful in other color films which may have other than the conventional layer arrangements. The thin layers made possible by this invention can be used advantageously in negative, positive or reversal color films which may be for cine or still use, in transparencies, prints for viewing by reflected light, intermediate films, etc.

The invention, moreover, is not limited to the specific light-sensitive material described in the above detailed examples. Various other simple and mixed silver halides may be used as the light-sensitive materials in like manner. Mixtures of silver bromides, chlorides, and/or iodides can be made by adding mixtures of soluble salts of these halides in like manner. Other useful soluble halides include calcium bromide, potassium iodide, sodium and potassium chlorides and iodides, etc.

Inert ingredients, e.g., pigments, colloidal silver, polymer latices, matting agents, etc. may be present in all of the element layers including the support. The element may also contain chemical sensitizers, optical sensitizers, coating aids, antifoggants, non-halation dyes and pigments, brightening agents as known to the art, etc. Any of the film supports disclosed in U.S.P. 3,211,552, may be used in preparing the elements of this invention.

Lipophilic colored couplers, e.g., for automatic color correction, may be employed as well as the essentially non-colored color formers illustrated in the examples.

The dispersants employed for the preparation of the lipophilic color-coupling polymer latices include all types, but ionic surfactants are preferred and anionic types in particular. Amphoteric types such as C-cetyl betaine, the N-alkyl aminopropionates, the N-alkyl iminodipropionates, etc., also may be employed and can prevent latent image fading due to the active amino content. The soap-type couplers of U.S. Patents 3,050,394 and 3,080,233, and the polymer-type couplers of U.S. Patent 2,513,190, also may be employed as dispersants. Polymers, e.g., gelatin, polyvinyl alcohol, polyvinyl pyrrolidone and acrylic acid, can be included either alone or in combination with other surfactants.

When a permanent organic plasticizer is employed in addition to the temporary solvent, it is necessary to limit the concentration of the former to preserve the physical properties of the lipophilic polymer and to avoid liquifying these dispersed copolymeric color coupler particles. The liquid droplets of color couplers of the prior art are excessively soft for binder action and also contribute excessively to emulsion thickness. To achieve the ultimate emulsion thinness, while still enjoying the benefits of plasticization by permanent solvents, it has been found that dispersed lipophilic polymer particles can absorb the permanent solvent after latex formation. For example, a high-boiling plasticizer such as benzyl alcohol, dimethyl phthalate, a sulfone, etc., can be added to one or more of the processing baths with effective absorption to the copolymer particles resulting. By this methd, of course, the high-boiling solvent causes no increase in emulsion thickness at the time of imagewise exposure and thus cannot cause a decrease in definition. The high-boiling point solvents must contain a semipolar oxygen, i.e., an oxygen atom connected by a semipolar bond to carbon, nitrogen, phosphorus or sulfur.

In preparing the copolymeric color couplers, it is desirable to select noncolor coupling comonomers which will yield the low equivalent weight copolymers required for the coating of thin emulsion layers. The lowest equivalent weight copolymers are not necessarily obtained by the use of noncolor coupling comonomers of the lowest molecular weight. For example, it was found that copolymers of adequate solubility could be made with lower equivalent weight using 2-ethylhexyl acrylate instead of ethyl acrylate as the noncolor coupling comonomer when used with a color coupling comonomer such as α-benzoyl-2-methoxy-5-methacrylamidoacetanilide. When copolymerized with at least one mole of the specified non-coupling ester comonomer, this particular color-coupling structure, which alone was very insoluble in ethyl acetate due to its two amide hydrogens, was easily solubilized in the volatile solvents employed to make these coupling latices.

The extent of polymerization that occurs in the formation of the present color coupling copolymers is an important factor in determining their utility. Previous workers have been discovered from attempting to polymerize the color coupling monomers because of the recognized inhibiting effect of the active ethenol group. However, it has now been discovered that copolymerization with an active, non-coupling comonomer provides a useful means for polymerizing the coupling monomer to the desired extent.

A particular advantage of this invention is that placing the copolymer color coupler in the dispersed phase, rather than in the continuous gelatin emulsion phase, eliminates the problem of brittleness in the final photographic element. The coated emulsions have little tendency to crack, even at low relative humidity. Earlier, when copolymeric couplers were placed in the continuous gelatin emulsion phase, it was necessary that the copolymer contain water solubilizing groups, e.g., carboxyl or sulfonate groups. Such hydrophilic copolymers, in addition to brittleness, cause the disadvantages of (a) unstable emulsion viscosity (including thixotropy) and attendant problems in the coating operation, (b) processing problems, especially in influencing first development rate in reversal processing and the buffer drain on the processing solutions caused by the acid solubilizing groups and the problems of excessive emulsion swelling during processing, and (c) aging problems caused by the interaction of the soluble coupling polymer with the silver halide crystals. The above enumerated disadvantages are all overcome with the use of dispersions of the water insoluble, lipophilic copolymers of this invention which have been found to possess a particularly useful combination of low migration, low equivalent weight, and tough binder properties.

As another advantage, the dispersions of this invention, comprising relatively solid particles (unlike the liquid droplets of the high-boiling oil dispersion methods), contribute to the firmness and emulsion-binding action of gelatin. Thus it is possible to employ the dispersed copolymer as a replacement for a substantial part of the gelatin binder which would otherwise be required and, in so doing, achieve the desired thinness of emulsion layer coatings. Yet another advantage is the excellent resistance to migration, in conjunction with the unusually low equivalent weight, of these copolymeric color formers. Finally, film elements made according to the present invention can be used in reproducing images of excellent color quality particularly since their rapid development permits favorable development adjacency effects, both inter- and intra-image, and permits savings in processing time and machine size.

The embodiments of the invention in which an exclusive property or privilege is claimed are defined as follows:

1. A color-forming dispersion for the preparation of a light-sensitive photographic element which comprises an aqueous gelatin solution having dispersed therein
    (1) a color-coupling lipophilic copolymer prepared by free-radical initiated addition polymerization of an ester of acrylic acid, methacrylic acid or maleic acid and an ethylenically unsaturated monomer of the formula

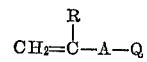

where R is hydrogen or lower alkyl, A is a bivalent radical of

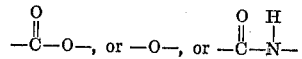

and Q is an organic color-forming radical containing the group

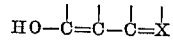

where

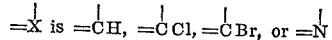

said ethylenically unsaturated monomer being further characterized by containing at least one amide-hydrogen group, and said copolymer being dissolved at a concentration of 10%–50% by weight in
    (2) an organic solvent for said copolymer having a boiling point below 200° C. and having a water-solubility no greater than that of methyl acetate.

2. A dispersion as defined in claim 1 where said low-boiling point solvent is a lower alkyl ester, a lower alkyl ether, a lower alkyl ketone, a lower alkyl halogenated hydrocarbon, or n-butyl through octyl alcohol.

3. A dispersion as defined in claim 1 where said emulsion contains a light-sensitive silver halide.

4. A dispersion as defined in claim 1 where said color-forming radical Q is a 1-phenyl-3-amido-5-pyrazolone, an acylacetanilide, or a 1-hydroxy-2-naphthamide.

5. A dispersion as defined in claim 1 where said low-boiling point solvent is a lower alkyl ester of acetic acid.

6. A dispersion as defined in claim 1 where said dispersion contains in an amount of less than 50% by weight of said copolymer of a water immiscible, organic solvent having a boiling point above 200° C.

7. A process for preparing a color-forming emulsion which comprises dispersing into an aqueous gelatin solution a solution of
  (1) a color-coupling lipophilic copolymer prepared by free radical initiated addition polymerization of an ester of acrylic acid, methacrylic acid or maleic acid and an ethylenically unsaturated monomer of the formula

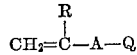

where R is hydrogen or lower alkyl, A is a bivalent radical of

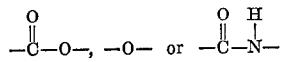

and Q is an organic color-forming radical containing the group

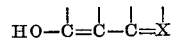

where

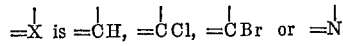

dissolved in
  (2) an organic solvent for said copolymer having a boiling point below 200° C. and having a water solubility no greater than that of methyl acetate, said color-forming radical being further characterized by containing at least one amido-hydrogen group, mixing said dispersion with a light-sensitive gelatino-silver halide emulsion and coating said mixture on a support, said low-boiling point solvent being removed anytime after dispersing said color former.

8. A process as defined in claim 7 where said Q radical is a 1-phenyl-3-amino-5-pyrazolone, an acylacetanilide or a 1-hydroxy-2-naphthamide.

9. A process as defined in claim 7 where said low-boiling point solvent is a lower alkyl ester, a lower alkyl ether, a lower alkyl ketone or a lower alkyl halogenated hydrocarbon.

10. A process as defined in claim 7 where said dispersion is mixed with a gelatino-silver halide emulsion in an amount to give from 1/2 to 2/1 weight ratio of color-coupling lipophilic copolymer to gelatin.

References Cited

UNITED STATES PATENTS 3,163,625  12/1964  Firestone et al. _____ 260—80.5
2,801,171  7/1957  Fierke et al.

NORMAN G. TORCHIN, *Primary Examiner.*

A. T. SURO PICO, *Assistant Examiner.*

U.S. Cl. X.R.

96—74